No. 633,824. Patented Sept. 26, 1899.
J. C. FLEMING.
HEATING AND VENTILATING APPARATUS FOR CARS.
(Application filed Nov. 26, 1898.)
(No Model.)
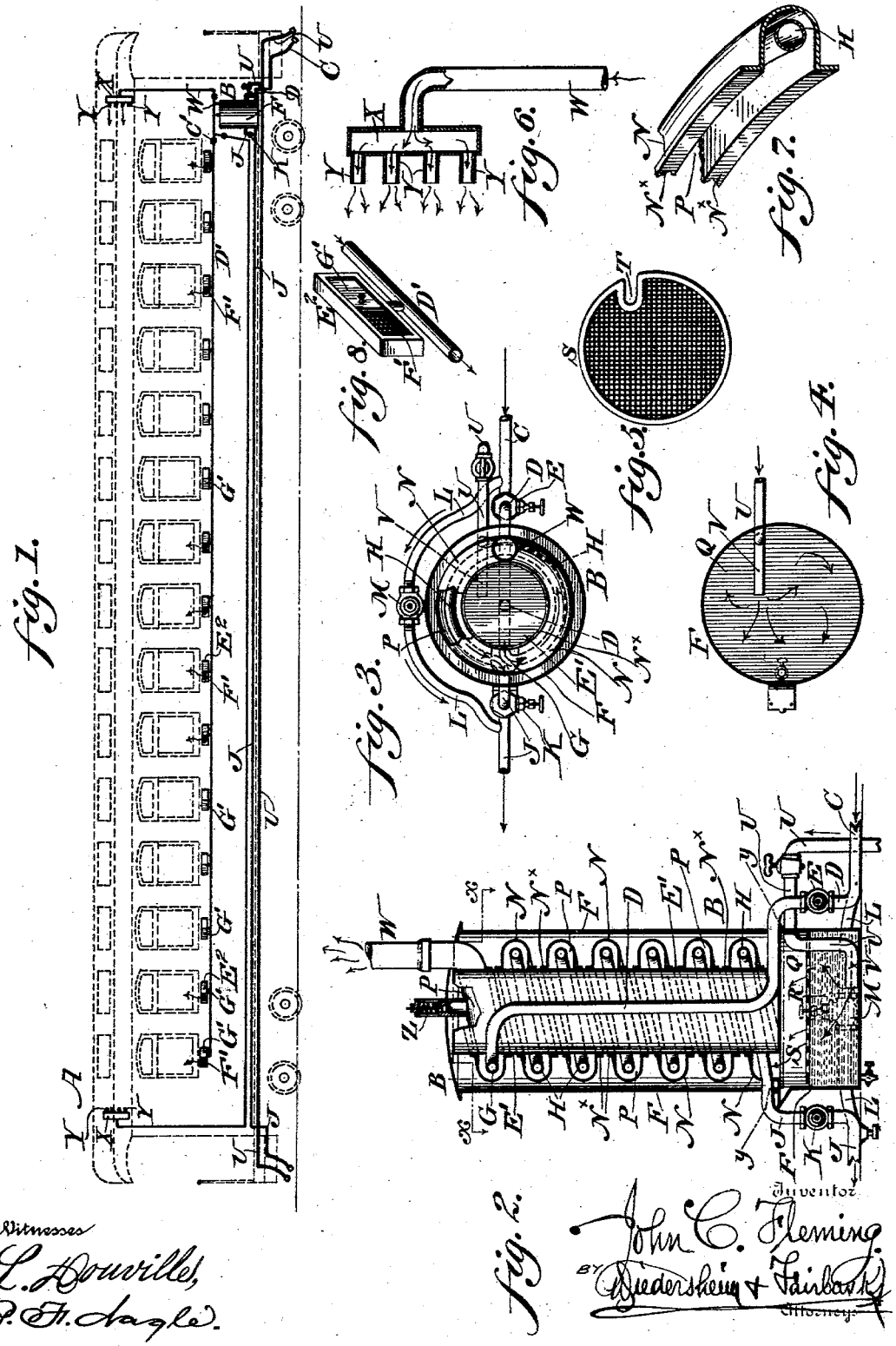
Witnesses
L. Douville,
P. F. Nagle.
Inventor
John C. Fleming
By Diedersheim & Fairbanks
Attorneys

UNITED STATES PATENT OFFICE.

JOHN C. FLEMING, OF PHILADELPHIA, PENNSYLVANIA.

HEATING AND VENTILATING APPARATUS FOR CARS.

SPECIFICATION forming part of Letters Patent No. 633,824, dated September 26, 1899.

Application filed November 26, 1898. Serial No. 697,506. (No model.)

*To all whom it may concern:*

Be it known that I, JOHN C. FLEMING, a citizen of the United States, residing in the city and county of Philadelphia, State of Pennsylvania, have invented a new and useful Improvement in Apparatus for Ventilating and Heating Cars, which improvement is fully set forth in the following specification and accompanying drawings.

My invention consists of an improved and compact construction of combined apparatus for ventilating and heating cars whereby I am enabled to purify and heat the air which is forced into the cars by means of a suitable compressor carried, preferably, upon the engine, provision being also made for discharging purified air of increased or normal temperature into the car at various points along the length thereof, as may be desired.

It also consists of a novel means of heating and purifying the air prior to discharging the same into the car, the heating medium being conducted through the air-passage in a direction opposite to the movement of the current of air.

To the above ends the invention consists more especially of a lower casing or water-compartment, an upright drum supported thereupon, a helical or sinuous casing forming an air-passage supported on said drum and opening into said lower casing, and means for conducting purified compressed air in heated or normal condition to the desired points.

It further consists of novel details of construction, all as will be hereinafter fully set forth, and particularly pointed out in the claims.

Figure 1 represents a diagrammatic view of an apparatus for ventilating and heating cars embodying my invention. Fig. 2 represents, on an enlarged scale, a vertical sectional view of the apparatus for heating and purifying the air. Fig. 3 represents a section on line $xx$, Fig. 2. Fig. 4 represents a section on line $yy$, Fig. 2. Fig. 5 represents a plan view of a device employed to prevent splashing of the liquid used for purifying or disinfecting the air. Fig. 6 represents a sectional view, partly in elevation, showing the discharge-pipe for the purified air. Fig. 7 represents a broken perspective view of a portion of the casing for the helical or spiral air-passage employed. Fig. 8 represents a perspective view showing the appliance for regulating the discharge of the purified air into the car.

Similar letters of reference indicate corresponding parts in the figures.

Referring to the drawings, A designates a car, and B the apparatus for heating and purifying air prior to its discharge thereinto.

C designates a pipe leading from a source of steam-supply, preferably the engine, said pipe having an upward branch D, in which is located the valve E, said branch being continued upwardly within the shell or drum E', which is inclosed within the outer casing F of the heating and purifying apparatus B.

From the point G the steam-pipe is coiled downwardly, as at H, leaving the casing F by the branch J, which has the valve K therein, said branch J leading to the heating and ventilating apparatus carried by the next car or to any other desired point.

L designates a branch leading from the pipe C to the pipe J and provided with the valve M.

N designates a spiral (preferably U-shaped) casing, which is attached to the drum E' by flanges $N^\times$ or other means, whereby a spiral air-passage P is formed, in which the coils H are located.

Q designates a chamber located in the lower portion of the casing F, in which is contained the liquid R, which may be water in solution with desired chemicals or other purifying or disinfecting material, which is prevented from undue splashing by the employment of the screen S, which is recessed at T to allow the air-pipe U to pass therethrough, said pipe having the discharge portion V thereof entering the liquid R or chamber Q at one side thereof, as will be understood from Fig. 4. The spiral passage P is in communication at its lower portion with the chamber Q and discharges at its upper extremity into the pipe W, which leads to the hollow head X, which has the outlets Y.

Z designates a safety-valve for permitting the escape of any excess of air-pressure in the passage P, it being understood that air is forced into the pipe U from any suitable source, as an air-compressor carried by the engine, (not shown,) said air-pipe being provided with a cock or valve C', which leads to the pipes D', whereby the purified air is conducted to the chambers E², which are provided with the screens F' and the slides G', whereby the desired quantity of air can be admitted to the car at various points along its length.

The operation is as follows: Air under pressure is forced through the pipes V into the purifying or disinfecting medium R, where dust and impurities are trapped, and passes thence through the coiled or sinuous passages P and outlets W to the compartments E² or the outlets Y, the air when it reaches the pipe W being in a purified condition, as is evident. When it is desired to heat the air after passing through the chamber Q, the valve M is closed and the valves E and K opened, whereupon steam from the engine or other source passes through the pipe C and downwardly through the coils H, so as to thoroughly heat the air contained in the sinuous passages P, as is evident. When it is desired to cut off the supply of steam to the apparatus B, it can be done by closing the valve E and K and opening the valve M, whereupon it will be seen that the steam will flow from the pipe C to the pipe J without passing through the casing F.

It will be seen that by my invention purified air of increased or normal temperature can be discharged into a car without changing its present construction, and cars equipped with my apparatus will be evenly and equably ventilated with pure air throughout, said air being heated or not, as may be desired.

It will be understood that the section of steam-piping intermediate the heating and purifying apparatus on each car is provided with a suitable non-conducting covering whereby undue radiation and consequent excessive heating of the cars is prevented.

It will thus be seen from the foregoing that I have produced a compact and practical apparatus whereby the car can be ventilated and is provided with hot or cold purified air when the train is stationary or moving. The water or chemicals in solution therewith can be delivered into and withdrawn from the chamber Q in any suitable manner, and any water of condensation can be readily trapped or withdrawn from the steam-pipe at any desired point after it leaves the heater and purifier.

The surfaces in contact with the heated air are in practice preferably lined with non-oxidizable material, and by this means air is delivered into the car with its supply of oxygen undiminished.

Although I prefer that the steam be taken from the boiler of the engine and that the air be forced through the system by means of an air-compressor also carried on the engine, I do not desire to be limited thereto in every instance, as it is evident that changes in these and other respects may be made by those skilled in the art without departing from the spirit of my invention.

Having thus described my invention, what I claim as new, and desire to secure by Letters Patent, is—

1. In an apparatus for ventilating and heating cars, a chamber for the reception of the liquid, an air-pipe leading into the latter below the surface thereof, an upright drum supported above said chamber, a helical substantially U-shaped casing forming a helical air-passage inclosing said drum and opening into said chamber, a heating-pipe leading into the upper portion of said helical passage and thence downwardly therethrough, valves in said heating-pipe, near its inlet and exit from said apparatus, a valved branch communicating with said heating-pipe below said valves, a pipe leading from said air-passage to various points of the car, and means for controlling the flow of heated air through said car.

2. In an apparatus for ventilating and heating cars, a chamber for the reception of a liquid, a pipe for conducting air under pressure to a point below the surface of said liquid, an upright drum supported above said chamber, a helical or sinuous air-passage supported on said drum and opening into said chamber, a safety-valve for said air-passage, a heating-pipe leading downwardly through said air-passage, valves in said heating-pipe near its inlet and exit to said apparatus, a valved branch communicating with said heating-pipe below said valves, said branch partially surrounding said apparatus and forming a communication with that portion of the heating-pipe leading to the next car, a pipe leading from said air-passage to various points in a car, and screens and valves for controlling the flow of heated air to said car.

3. In an apparatus for ventilating and heating cars, a lower chamber adapted to contain a liquid, a drum supported above said chamber, a helical casing inclosing said drum and secured thereto, thereby forming a sinuous or helical air-passage, a safety-valve for the latter, a discharge-pipe leading from said passage and discharging into the front or rear of the car, or at various points along the length thereof, and screens and valves for controlling the flow of air through said points.

4. In an apparatus for ventilating and heating cars, a casing having a chamber for the reception of liquid in the lower portion thereof, an air-pipe discharging thereinto at a point below the surface of said liquid, a screen for preventing splashing of said liquid, a sinuous or helical air-passage leading upwardly from said chamber, an upright drum to which the casing forming said air-passage is secured, a pipe leading from said passage to various points in a car, and screens and slides for controlling the discharge of air into said car.

5. In an apparatus for ventilating and heating cars, a chamber for the reception of a liquid, a pipe for conducting air under pressure to a point below the surface of said liquid, a closed casing supported above the same, a helical or sinuous air pipe or passage situated within said casing, an upright drum supported above said chamber to which said helical pipe is attached and communicating at its lower end with said chamber, the upper end of said air pipe or passage passing through the upper end of the casing and leading to suitable point of discharge, and a heating-pipe situated within said air pipe or passage with its ends extending through the sides of the casing.

6. In an apparatus for ventilating and heating cars, a casing, a chamber in the lower portion thereof for the reception of a liquid, a screen adapted to rest upon said liquid, an upwardly-extending sinuous casing forming an air-passage communicating with said chamber, a safety-valve for said passage, an upright drum supported above said chamber exterior to which said sinuous casing is secured, a steam-pipe leading upwardly through said shell, and downwardly through said passage, valves in said steam-pipe and a valved branch communicating with said steam-pipe below said valves, in combination with an air-pipe leading to said chamber.

7. In an apparatus for ventilating and heating cars, a chamber for the reception of a liquid, a pipe for conducting air under pressure to a point below the surface of said liquid, a closed outer casing supported above said chamber, a drum situated within said casing and above said chamber, a helical casing secured to said drum and having its lower end communicating with said chamber and its upper end passing through the upper end of said casing and leading to suitable points of discharge, and a heating-pipe situated within said helical casing with its ends extending through the sides of the casing.

8. In an apparatus for ventilating and heating cars, a chamber for the reception of a liquid, a pipe for conducting air under pressure to a point below the surface of said liquid, a helical or sinuous air pipe or passage communicating with said chamber and leading to suitable points of discharge, an upright drum located above said chamber and supporting said helical pipe, a casing supported above the same and inclosing said air pipe or passage, a heating-pipe having a branch communicating therewith at two points, said pipe extending through said helical passage, valves in said heating-pipe above said branch pipe, and a valve in said branch pipe intermediate the junctions of the latter with said heating-pipe.

9. In an apparatus for ventilating and heating cars, an outer casing, a lower chamber for the reception of a liquid, means for conducting air under pressure to a point below the surface of said liquid, an upright drum supported above said chamber, a helical or sinuous casing surrounding said drum and communicating with said chamber above said liquid, whereby a sinuous air-passage is formed, a screen for the top of said liquid, a heating-pipe leading into the upper portion of said sinuous casing and continued downwardly therefrom to the exterior of said casing, a branch connecting portions of said heating-pipe prior to and after the entrance of the latter to said casing, valves in said heating-pipe above the junctions of the latter with said branch, the latter partially surrounding said outer casing, and a valve in said branch.

10. In an apparatus for ventilating and heating cars, an outer casing, a lower chamber for the reception of a liquid, means for conducting air under pressure to a point below the surface of said liquid, an upright drum supported above said chamber, a helical casing surrounding said drum and communicating with said chamber above said liquid, a heating-pipe leading into the upper portion of said sinuous casing and continued downwardly to the exterior of said casing, a branch connecting portions of said heating-pipe prior to and after the entrance of the latter to said casing, valves in said heating-pipe above the junction of the latter with said branch and a valve in the latter.

JOHN C. FLEMING.

Witnesses:
JOHN A. WIEDERSHEIM,
WM. C. WIEDERSHEIM.